(12) United States Patent
Henning

(10) Patent No.: US 7,188,817 B2
(45) Date of Patent: Mar. 13, 2007

(54) MOLDED DECK BOARD

(75) Inventor: Steven A. Henning, Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 11/168,623

(22) Filed: Jun. 28, 2005

(65) Prior Publication Data
US 2005/0236547 A1   Oct. 27, 2005

Related U.S. Application Data

(62) Division of application No. 09/879,478, filed on Jun. 12, 2001, now Pat. No. 6,910,668.

(51) Int. Cl.
*A47B 91/00* (2006.01)
(52) U.S. Cl. .............. 248/346.02; 108/57.29; 108/901; 296/24.44; 52/177
(58) Field of Classification Search .......... 248/346.02; 52/386, 387, 384, 126.1, 177, 127.8, 507, 52/391, 591.2, 220.3, 220.4, 220.6, 220.8, 52/177 X, 388, 581, 100, 747.11; 108/901, 108/90, 91, 108, 51.11, 57.28, 57.29; 312/257.1, 312/265.2; 211/153, 90.04; 105/370, 371, 105/375, 422; 410/89; D25/138, 156, 158; 414/799; 296/24.44 X
See application file for complete search history.

(56) References Cited

U.S. PATENT DOCUMENTS

| | | | | |
|---|---|---|---|---|
| 999,256 A * | 8/1911 | Pulliam | ...................... | 105/415 |
| 1,787,022 A * | 12/1930 | Seeley | ...................... | 126/339 |
| 3,241,334 A * | 3/1966 | Amore | ...................... | 62/382 |
| 3,352,595 A * | 11/1967 | Bezlaj | ...................... | 410/139 |
| 3,433,184 A * | 3/1969 | Addy | ...................... | 108/53.3 |
| 3,875,871 A * | 4/1975 | Thornton et al. | ........... | 105/375 |
| 3,927,769 A * | 12/1975 | Maslow et al. | ............. | 211/153 |
| 3,929,371 A * | 12/1975 | Gibson | .................... | 296/24.44 |
| 3,986,462 A * | 10/1976 | Heft | ........................... | 108/188 |
| 3,998,069 A * | 12/1976 | Kronenberger et al. | ....... | 62/288 |
| 4,013,020 A * | 3/1977 | Schoeller et al. | ........ | 108/57.16 |
| RE29,192 E * | 4/1977 | Anderson et al. | .......... | 108/51.3 |
| 4,051,787 A * | 10/1977 | Nishitani et al. | .......... | 108/55.3 |
| 4,194,495 A * | 3/1980 | Scherer | ...................... | 126/339 |
| 4,266,718 A * | 5/1981 | Sivon | ........................... | 238/9 |
| 4,312,152 A * | 1/1982 | Drury et al. | ................... | 47/63 |
| 4,436,779 A * | 3/1984 | Menconi et al. | ........... | 428/169 |
| 4,519,508 A * | 5/1985 | Gullett et al. | .............. | 211/59.2 |
| 4,709,642 A * | 12/1987 | Briosi | ........................ | 108/187 |
| 4,890,746 A * | 1/1990 | Trulaske, Sr. | ................ | 21/59.2 |

(Continued)

*Primary Examiner*—Korie Chan
(74) *Attorney, Agent, or Firm*—Maginot, Moore & Beck

(57) ABSTRACT

A plastic molded deck board provides a sturdy, durable, lightweight, economical, readily identifiable, and easily handled surface for supporting cargo on top of trailer load beams. The deck board defines a platform having a top face for supporting cargo, a bottom face and a plurality of side faces. The top face defines a plurality of protrusions having variable shapes and heights and rubber stoppers for providing surface friction. The bottom face defines a plurality of side walls, a plurality of angled cross walls, a first platform channel and optionally a second platform channel disposed between the plurality of angled cross walls for receiving a center load beam of a cargo trailer. The top face defines recessed slots for receiving the angled cross walls of another deck board such that two or more deck boards can be securely stacked.

18 Claims, 8 Drawing Sheets

U.S. PATENT DOCUMENTS

| | | | |
|---|---|---|---|
| 5,228,581 A * | 7/1993 | Palladino et al. | 211/153 |
| 5,375,534 A * | 12/1994 | Adams | 105/372 |
| 5,538,147 A * | 7/1996 | Fucci | 211/153 |
| 5,570,643 A * | 11/1996 | Werner | 108/51.11 |
| 5,577,623 A * | 11/1996 | Bustos | 211/187 |
| 5,697,302 A * | 12/1997 | Putnam | 108/90 |
| 5,894,804 A * | 4/1999 | Werner | 108/53.5 |
| 5,964,163 A * | 10/1999 | Cohen | 108/91 |
| 5,993,936 A * | 11/1999 | Gardner | 428/131 |
| 6,184,468 B1 * | 2/2001 | Speziale | 174/66 |
| 6,328,170 B1 * | 12/2001 | Lee | 211/59.2 |
| 6,401,945 B1 * | 6/2002 | Gawel | 211/183 |
| 6,408,770 B1 * | 6/2002 | Mason | 108/54.1 |
| 6,467,224 B1 * | 10/2002 | Bertolini | 52/177 |
| 6,585,306 B1 * | 7/2003 | Smith et al. | 296/24.44 |
| 6,854,400 B2 * | 2/2005 | Sullivan | 105/372 |
| 2002/0174807 A1 * | 11/2002 | Mason | 108/51.11 |

* cited by examiner

SECTION A-A

MOLDED DECK BOARD

This application is a divisional of U.S. application Ser. No. 09/879,478, filed on Jun. 12, 2001 now Pat. No. 6,910,668. The present invention relates to cargo handling structures, particularly deck boards. More specifically, the invention concerns a plastic molded deck board that forms a surface for supporting cargo on top of trailer load beams.

BACKGROUND OF THE INVENTION

To fill a cargo trailer to the load weight limit, cargo often must be stacked more than one pallet high. To facilitate stacking without damaging cargo, load beams can be mounted horizontally in a trailer; just above the top of floor loaded cargo. Deck boards for supporting additional cargo can then be placed on top of the load beams.

Deck boards that are sized and equipped for placement on trailer load beams are generally constructed of wood. Use of wood or plywood and the resulting design and construction presents many disadvantages. For example, deck boards constructed of wood closely resemble cargo pallets, so they are easily misused or misplaced. Theft is common since wood deck boards can be disassembled and the wood used for another purpose. The wood used for constructing deck boards is also susceptible to damage, from use and outdoor storage, including splintering, cracking, warping, and breaking. Since wood deck boards are necessarily constructed of multiple components, fasteners or glued joints used to assemble components are a point of potential degradation and failure.

The cost of wood has generally escalated in recent decades, making manufacture of deck boards expensive. The weight of the wood necessary to construct a sufficiently strong and durable deck board is greater than the weight of certain other materials. When using wood, individual components must be assembled and handholds, cargo strap holes, and anchor points must be individually milled through the wood.

In light of the shortcomings of prior deck boards, there remains a need for a single piece deck board that is sturdy, durable, and lightweight. The deck board should be economically manufactured, readily identified, and easily and safely handled.

SUMMARY OF THE INVENTION

Briefly describing one aspect of the invention, the deck board comprises a rectangular platform having a substantially flat front face and a plurality of raised ribs on the bottom face. The platform is sized and shaped for placement on trailer load beams, the raised ribs being sized and shaped to form channels for receiving the load beams and for restraining movement of the deck board relative to the load beams.

The difficulties with prior deck boards are overcome in one aspect of the current invention by forming the deck board from molded plastic rather than the typical composition of wood. Plastic composition differentiates the deck board from commonly misused and misplaced pallets. The composition also makes theft less likely than for easily dismantled wood deck boards. Identification of ownership and use can be improved further by mixing specific color dyes with the plastic and also by molding a company logo or use-identifying design into the deck board.

A deck board constructed of plastic is also more resistant to splintering, cracking, warping, and breaking, and does not require fasteners or glue-joints that may fail, making it virtually unbreakable. To further strengthen the deck board, the side faces formed by all features can be rounded to distribute stress points. In a further aspect, the four 90° corners of the platform can be truncated into a notch and two 135° corners. Raw material costs and standard molding techniques, such as rotational molding or blow molding, which forms all features into the deck board in a single action, make the manufacturing of the invention more economical than that of a wood deck board.

In a further aspect, the deck board can be easily and safely handled with a plurality of handholds that can be molded into the platform. The plurality of handholds can also be used for cargo straps that secure the cargo to the deck board or the deck board to the cargo trailer. To further secure cargo, the top surface can be molded with nodular protrusions to increase friction and make the top resistant to skidding. To secure the deck board, a plurality of retainer holes can be defined along the periphery of the platform so that the deck board can be secured to the load beams or adjacent deck boards.

In another aspect of the invention, the deck board has a pattern of raised ribs on the bottom face that form channels on the centerline of both axes of the bottom face. The raised ribs can also form shoulders along the perimeter of the bottom face. The channels and shoulders are preferably configured for receiving the load beams upon which the deck board rests, with one beam located in the center and one located on each of at least two opposite sides. With the deck board positioned on the load beams in this manner, the ribs cooperate with the load beams to retain the deck board on the beams.

Another feature of the invention is constituted by a plurality of bores that extend from the top face through to the bottom face. The bores have interior cylindrical walls connecting the top face to the bottom face to increase the rigidity of the deck board. The bores are preferably located in the channels where the weight of the cargo is transferred from the deck board to the center load beam.

In another embodiment of the present invention, a deck board comprises a stackable platform for fitting in a cargo trailer. The platform defines a top face for supporting cargo, a plurality of side faces extending along a perimeter of the platform, and a bottom face at the underside of the platform. The bottom face defines a plurality of side walls extending from the side faces along a plurality of edges of the platform. The platform can be positioned such that a center of the platform rests on a center load beam, and at least two edges of the platform rest on at least two end load beams.

Preferably, the plurality of side walls includes a plurality of outer side walls and a plurality of inner side walls offsetting the outer side walls by at least a half of the width of the end load beam. In addition, the bottom face further defines a plurality of angled cross walls, each having a first end disposed near the center of the platform and a second end abutting each of the side walls at a right angle. Preferably, the first end of each angled cross wall has an extended height gradually decreasing towards the second end, which flushes with the side wall. The bottom face further includes a first channel and a second channel. The first channel is disposed between two angled cross walls and is extending from near the center to one of the edges. The second channel is disposed between two angled cross walls and is extending from near the center to an opposite edge, whereby the first channel and the second channel linearly line up forming a first platform channel for receiving the center load beam of the cargo trailer.

Preferably, the bottom face has a second platform channel disposed between angled cross walls, and extending between edges across the center and perpendicular to the first platform channel. The second platform channel allows a second orientation of the deck board on the center load beam.

Each of the first and the second platform channels preferably defines a plurality of support bars having substantially the same height as that of the side walls. When the deck board is positioned on load beams, the plurality of support bars rests on a top side of the center load beam, while the angled cross walls drape along two vertical sides of the center load beam. In the same instance, the side walls at the edges parallel to the center load beam rest on the end load beams.

Further in this embodiment, the bottom face of the platform defines a plurality of cross bars extending perpendicularly from the edges forming a honeycomb design for strengthening the platform.

Additionally, the top face defines a plurality of nodular protrusions operable to increase surface friction. Preferably, the nodular protrusions have variable shapes and heights such that they wear down at different rates and thus providing durable surface friction. In addition, the top face further defines a plurality of rubber stoppers, each having a top portion protruding slightly from the top face to prevent the cargo from sliding off the deck board.

In addition, the platform defines a plurality of openings therethrough. The plurality of openings serves to reduce the weight of the platform without reducing its strength. Two or more of the openings have a predetermined shape forming handholds or for receiving cargo fasteners.

In this embodiment, the platform further includes a plurality of bores extending between the top face and the bottom face therethrough for receiving support posts. The bores are disposed adjacent to each of the plurality of side walls along the edges of the platform, and along the first and the second platform channels.

Additionally, the top face further includes recessed slots for receiving the angled cross walls of another deck board such that two deck boards can be securely stacked together.

One benefit of the present invention is that all the features of the deck board are the same from any side face, so orientation is irrelevant when loading or unloading the deck board. Another benefit is the reduced weight of the deck board because the plastic composition, being hollow or solid, is capable of providing a strong structure.

In addition, the inventive deck board can be easily manufactured with some ownership indicia, whether by the color of the molded plastic or by a molded label or by a depression for receiving marking label. These and other objects, advantages, and features are accomplished according to the features, assemblies, and means of the present invention.

DESCRIPTION OF THE PREFERRED EMBODIMENTS

Figure 1:
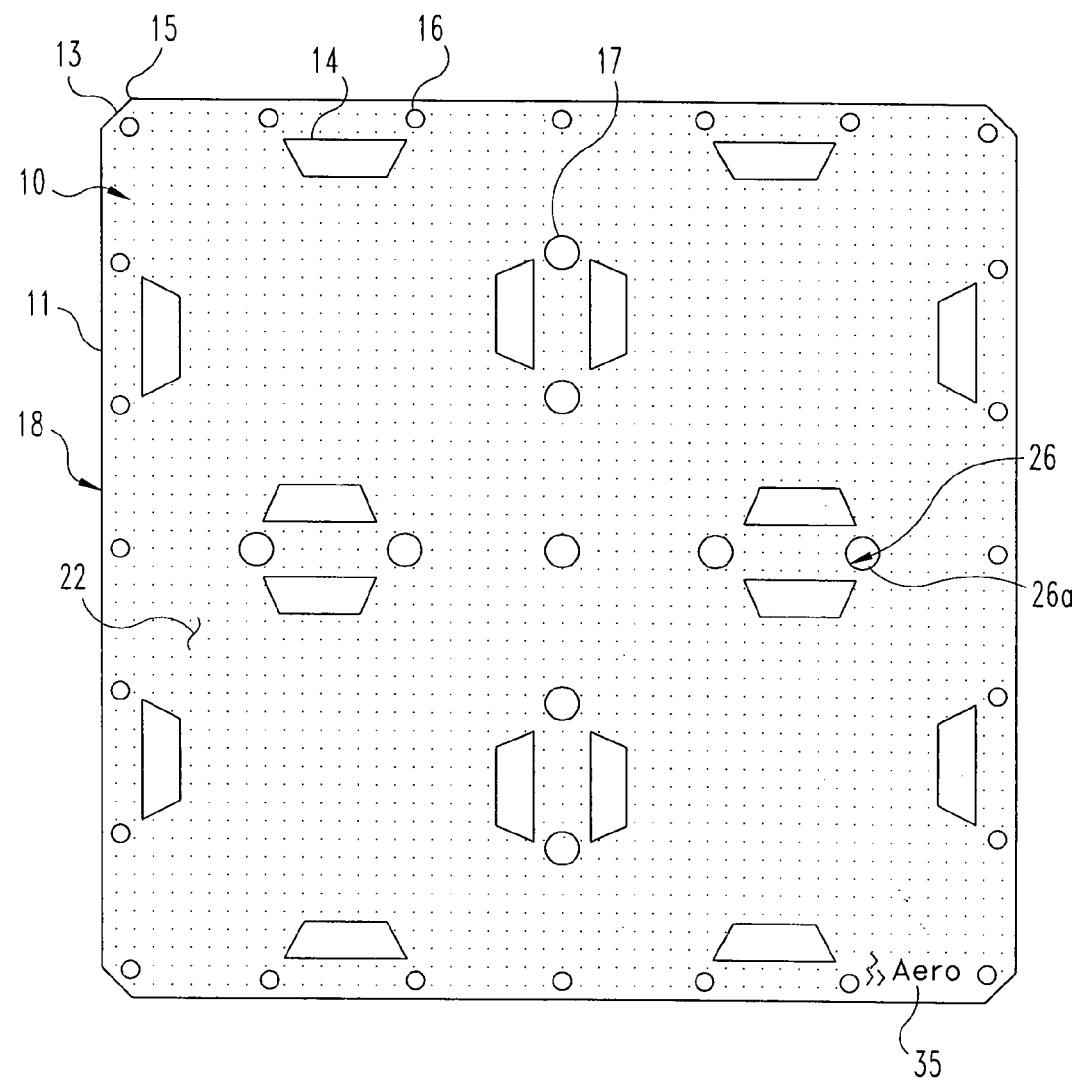
FIG. 1 is a top elevational view of a deck board according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention relates to cargo handling structures, particularly deck boards. More specifically, the invention concerns a plastic molded deck board that forms a surface for supporting cargo on top of trailer load beams.

In accordance with one embodiment of the present invention, deck board 10 is shown in FIG. 1. The deck board 10 can be formed as a single piece of molded plastic, nylon, or similarly durable, lightweight material. Standard molding techniques, such as rotational molding or blow molding, are preferred methods of construction, though other techniques could be used. The plastic composition produces a durable and lightweight deck board 10 that is readily distinguished from often misused and misplaced wood pallets.

Figure 5:
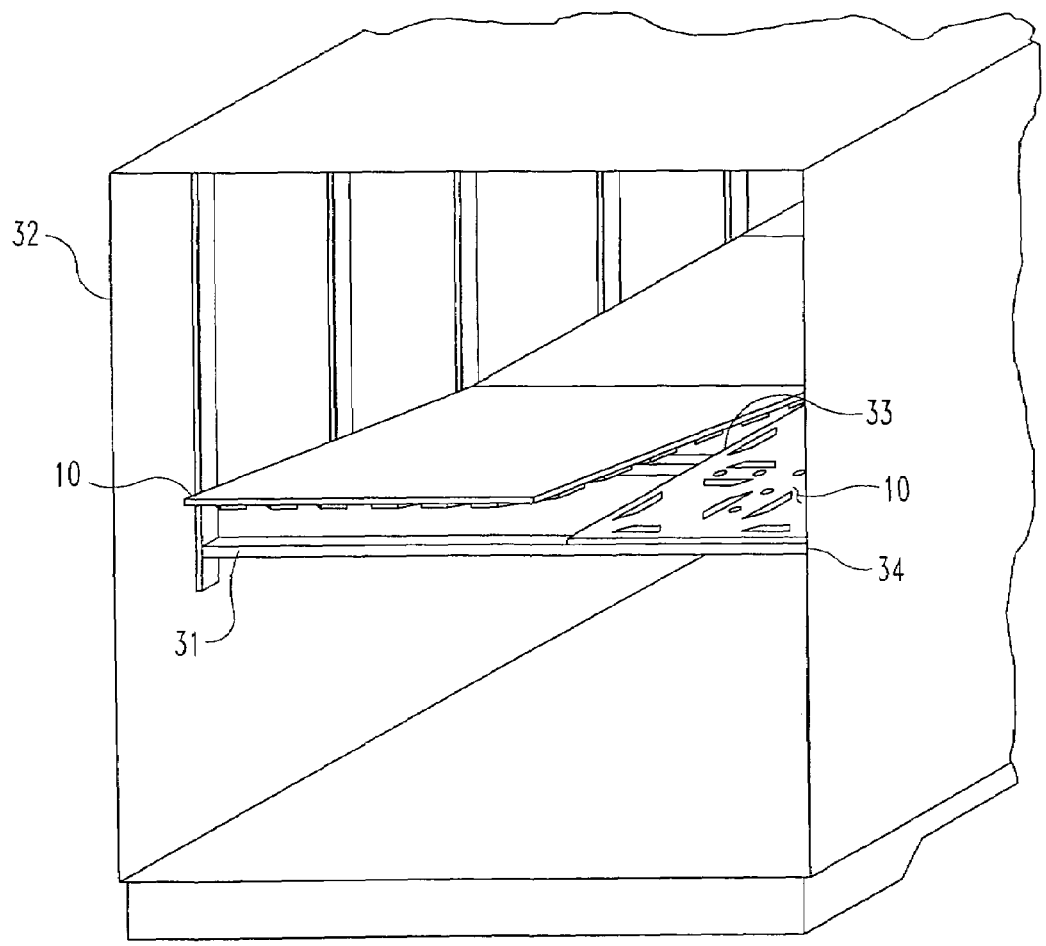
FIG. 5 is a perspective view of a cargo trailer with installed deck boards.

Referring to FIGS. 1–4, the deck board 10 comprises a rectangular platform 11 having a top face 22, a bottom face 23, and side faces 18. In one embodiment, the platform 11 can define a hollow chamber 24 enclosed by the top face 22, the bottom face 23, and the side faces 18. In a most preferred embodiment, the platform 11 is 4'×4'×1.25" and the material is plastic with a wall thickness of 0.1875". As depicted in FIG. 5, using this preferred size, several deck boards 10 can fit side-by-side in a conventional cargo trailer 32. The preferred embodiment is also lightweight and can be easily handled by one person. The deck board can be sized for accommodating other trailers, various load beam 31 configurations, or different cargo requirements. For example, a 4'×8' platform 11 could be constructed that would give uninterrupted support of larger cargo within a standard hauling trailer, and also reduce the number of deck boards 10 required for a given application. Load beams 31 are available that can be easily reconfigured to support various platform sizes.

At least one vent hole 27 can be defined in the molded platform 11, preferably at side face 18, to provide pressure equalization between the hollow chamber 24 and the ambient pressure. To increase resistance to cracking and splitting, stress can be distributed by using a 0.125" radius at the edges 28 formed by features of the deck board 10.

The top face 22 is substantially flat to support cargo. Preferably, the top face can include a plurality of small nodular protrusions 29 to increase the surface friction and reduce the likelihood of cargo slippage. The corners 13, of the platform 11 can be modified to reduce the likelihood of damage to the corners and likelihood of injury to persons handling the deck board 10. As viewed from the top face 22 or bottom face 23, each corner formed by adjacent side faces 18 can have a truncated or notched corner to replace the otherwise 90° corner 13 with two 135° corners 15.

Figure 2:
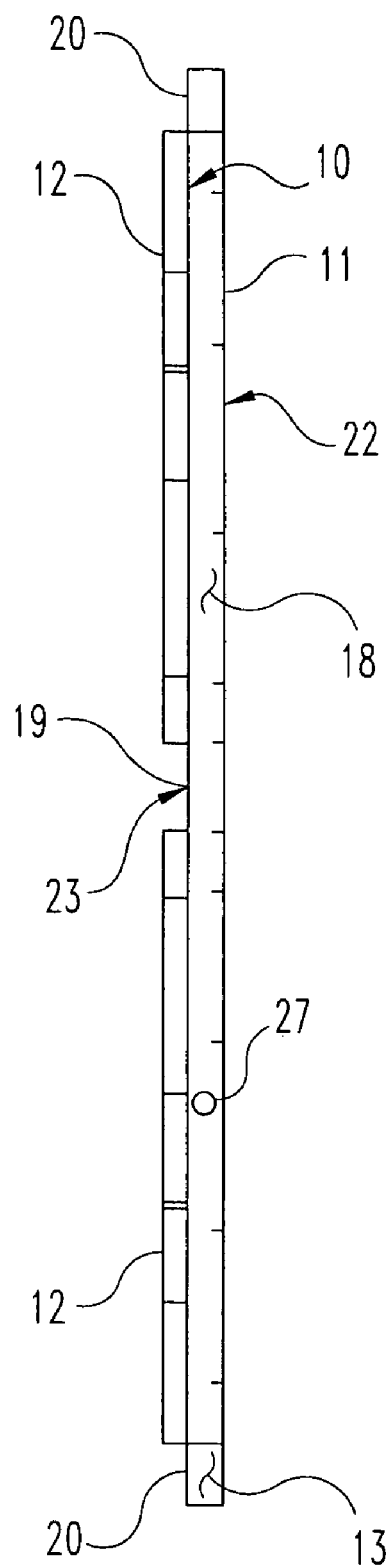
FIG. 2 is a side elevational view of the deck board depicted in FIG. 1.
Figure 3:
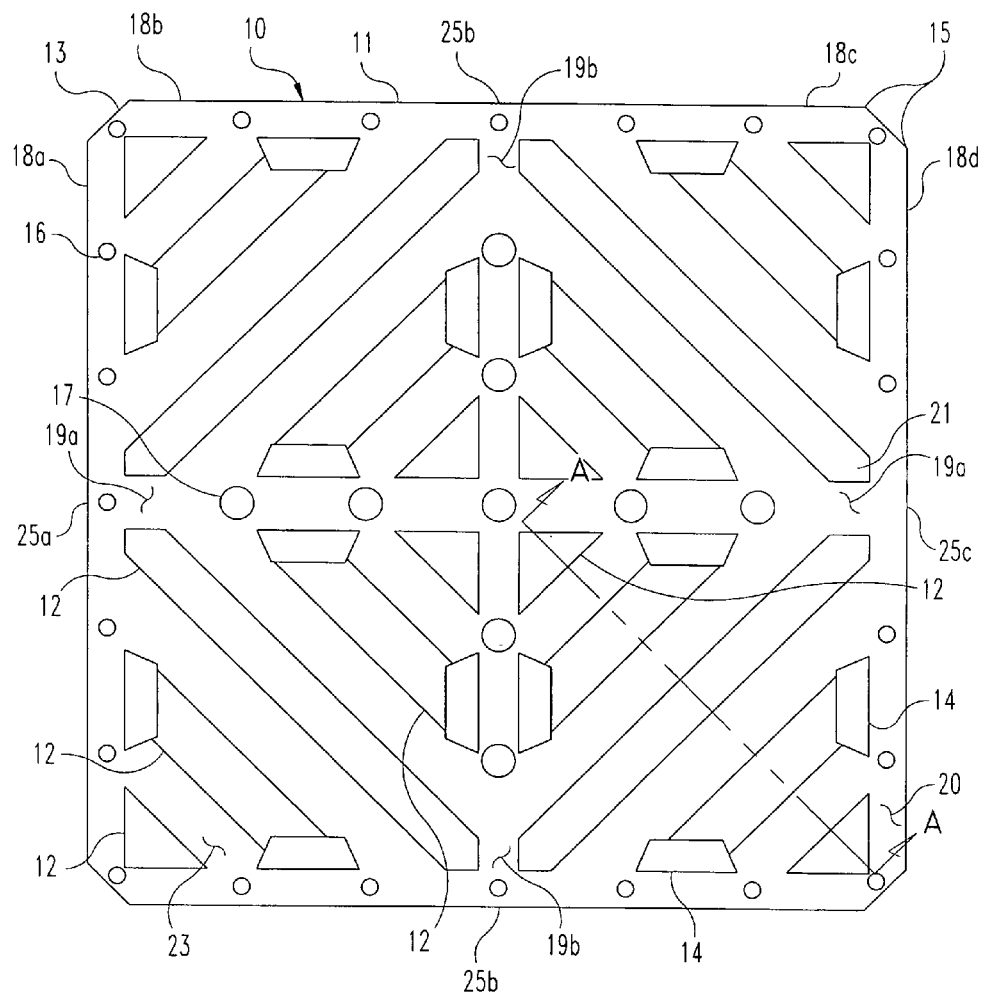
FIG. 3 is a bottom elevational view of the deck board shown in FIG. 2.
Figure 4:
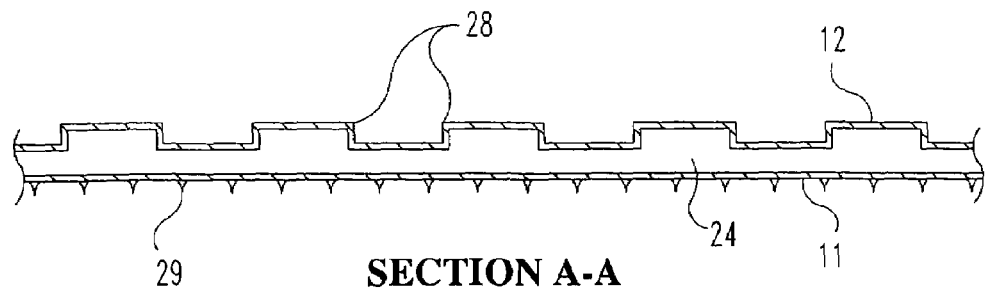
FIG. 4 is a cross-sectional view of the deck board shown in FIG. 3, taken along line A—A as viewed in the direction of the arrows.

Referring to FIGS. 2 and 3, a plurality of raised ribs 12 are defined on the bottom face 23 of the platform 11. The ribs 12 are oriented and positioned in a predetermined pattern so as to define channels 19 at the center lines of the bottom face 23 and shoulders 20 at the periphery. In one embodiment, depicted in FIG. 3, the ribs are 0.75" deep and extend across a quadrant of the bottom face 23 at 45° to the side faces 18. The truncated rib ends 21 are located and angled to define the center channels 19 and shoulders 20 for receiving load beams 31. The channels 19a and 19b are defined from the midpoint 25a and 25b of two side faces 18a and 18b, to the midpoint 25c and 25d of the opposite side faces 18c and 18d, operating to receive a supporting center load beam 33 on either axis of the bottom face 23. The shoulders 20 are of a predetermined width along the periphery of the bottom face 23 for receiving a supporting end load beam 34 along any two or more side faces 18a, 18b, 18c, and 18d, preferably along the two sides opposite the center load beams 33 as depicted in FIG. 5 in one embodiment the center channels 19 are 3" wide and the shoulders 20 are 2" wide, each sized for receiving load beams 31 slightly under 3" wide.

The ribs 12 and load beams 31 cooperate to maintain the position of the deck board 10. The ribs 12 abutting the load beams 31 inhibit sliding of the deck board 10 on the load beams. In one load beam configuration, depicted by FIG. 5, three parallel load beams 31 support a single deck board 10, one received by a center channel 19 and the other two received by opposite shoulders 20. Because the pattern of the channels 19 and shoulders 20 remain the same as viewed from any side face 18, the supporting center load beam 33 can be received by either channel 19a or 19b, and the end load beams 34 by either shoulders 20a and 20c or 20b and 20d. Thus, orientation, other than top face 22 versus bottom face 23, is irrelevant when loading or unloading the deck board 10.

The platform 11 can further define a plurality of bores 17 within the channels 19 and extending therethrough. Each bore 17 forms a walled interior cylinder 26 that functions to increase the rigidity of the platform 11 where the weight of the supported cargo is transferred from the deck board 10 to the center load beam 33. In one embodiment four 2", diameter bores are defined within each channel 19a and 19b and one bore is defined at the intersection of channels 19a and 19b. In one feature, a thin web 26A can extend across the interior wall 26 of any of the bores 17. The web 26A serves to initially close the opening but can be punched out as required. For instance, the web 26A can be removed if it is desired to provide drainage through the deck board, or to use the bore as a tie down location. Even with the web 26A in place, the bore 17 retains its beneficial structural capabilities.

The platform 11 can further define a plurality of retaining holes 16 within the shoulders 20 and extending therethrough. The holes 16 can receive fasteners, ropes, or other devices to secure the deck board 10 to the load beams 31 or to an adjacent deck board 10. In one embodiment, the retaining holes are 1" diameter.

The platform 11 can further define a plurality of openings 14 extending therethrough and having a predetermined shape suitable for functioning as handholds. In addition to functioning as handholds, the openings can receive cargo straps. The handhold openings 14 are preferably defined through the platform 11 in areas outside of the shoulders 20, channels 19, and raised ribs 12. The handhold openings 14 can be positioned individually or in opposing pairs. In one embodiment the handhold openings 14 are positioned in pairs spaced approximately shoulder width apart to accommodate easy handling. When viewed from each side 18a, 18b, 18c, and 18d, pair of openings 14 is located near the shoulder 20 and along the center channel 19.

In another embodiment as depicted in FIGS. 6–9, a deck board 50 comprises a plastic platform 51 having a top face 52 for supporting cargo, a plurality of side faces 54 extending along a perimeter P of the platform 51, and a bottom face 53 at the underside of the platform 51.

Figure 7:
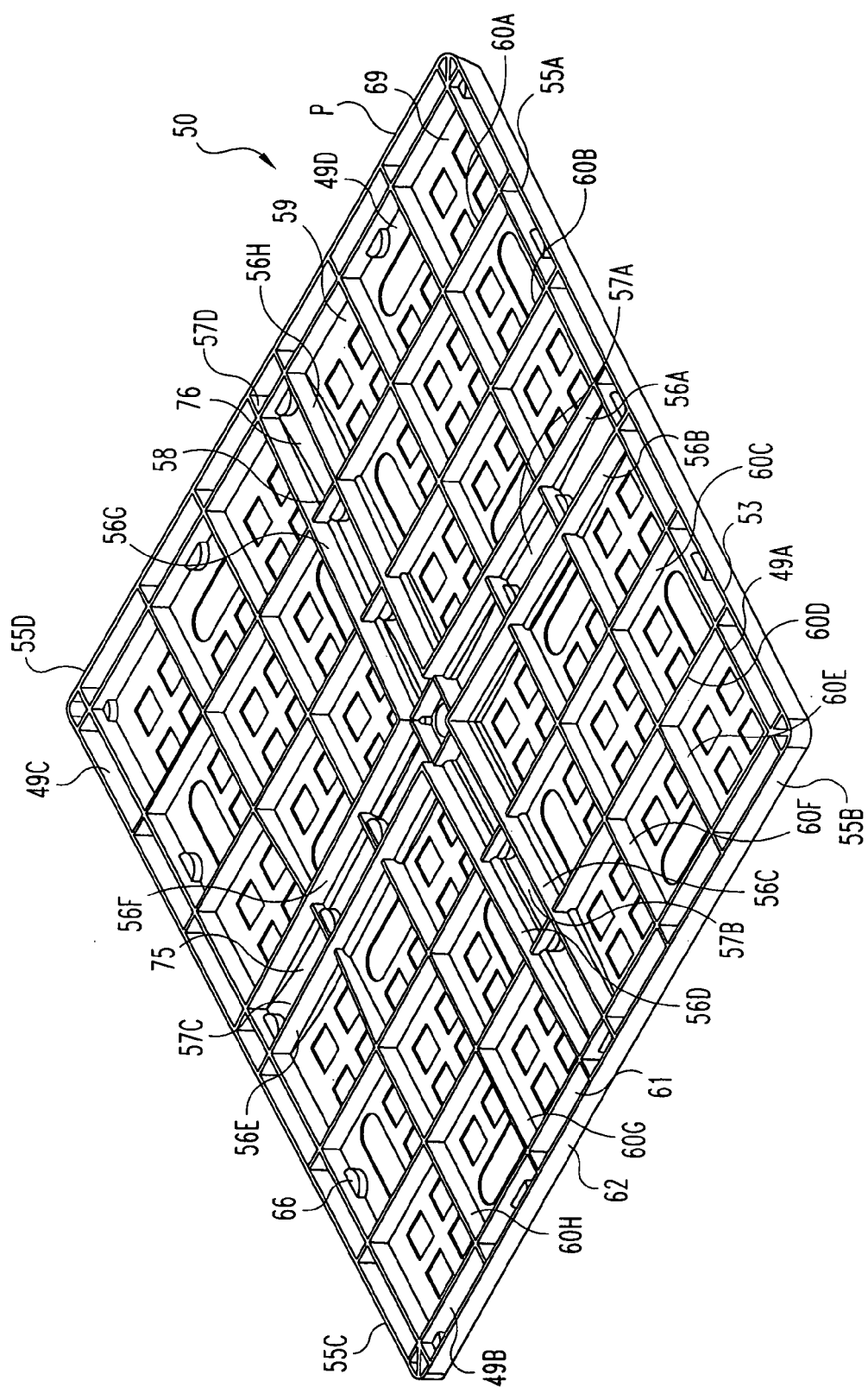
FIG. 7 is a perspective view of the bottom face of the deck board shown in FIG. 6.

As shown in FIG. 7, the bottom face 53 defines a plurality of side walls 55A, 55B, 55C, 55D extending from the plurality of side faces 54 along corresponding edges 49A, 49B, 49C, 49D of the platform 51. The platform 51 can be positioned on the load beams of a cargo trailer such that at least two of the plurality of edges 49A, 49B, 49C, 49D rest on at least two end load beams 72, while a center portion 48 of the platform 51 can rest on a center load beam 71 (see FIGS. 10 and 11).

The plurality of side walls 55A, 55B, 55C, 55D preferably includes a plurality of inner side walls 61 and a plurality of outer side walls 62, spaced apart to provide reinforcement for the platform 51. The inner side walls 61 are preferably offset from the outer side walls 62 by a half of the width of the end load beam 72. In a specific embodiment this offset is about 1".

The bottom face 53 further may define four angled cross walls 56A, 56B, 56E, 56F. Each of the angled cross walls has a first end disposed near the center 48 of the platform and a second end abutting one of the side walls 55A, 55B, 55C, 55D at a right angle. The first end of each of the angled cross walls 56A, 56B, 56E, 56F has an extended height, which gradually decreases towards the second end. The height of the second end of the walls 56A, 56B, 56E, 56F is substantially flush with the side walls 55A, 55C. The bottom face 53 further includes a first channel 57A and a second channel 57C. The first channel 57A is disposed between two angled cross walls 56A, 56B, and extends from near the center 48 to one edge 49A. Similarly, the second channel 57C is disposed between two angled cross walls 56E, 56F, and extends from near the center 48 to an opposite edge 49C. The first channel 57A and the second channel 57C linearly line up to form a first platform channel 75 for receiving a center load beam 71 of a cargo trailer (see FIG. 10).

The bottom face 53 may further include 57 a third channel 57B, and a fourth channel 57D. The third channel 57B is disposed between two angled cross walls 56C, 56D, and extends from near the center 48 to another edge 49B. Similarly, the fourth channel 57D is disposed between two angled cross walls 56G, 56H, and extends from near the center 48 to another opposite edge 49D. The third channel 57B and the fourth channel 57D linearly line up to form a second platform channel 76 extending perpendicularly to the first platform channel 75.

Figure 10:
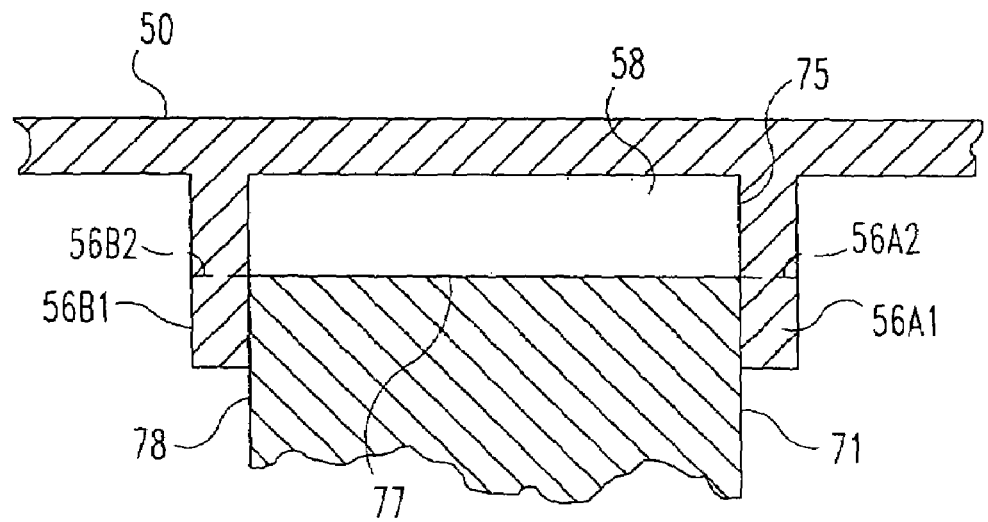
FIG. 10 is a cross-sectional view of one preferred embodiment of the deck board shown in FIGS. 6–7 mounted on a truck load beam.
Figure 11:
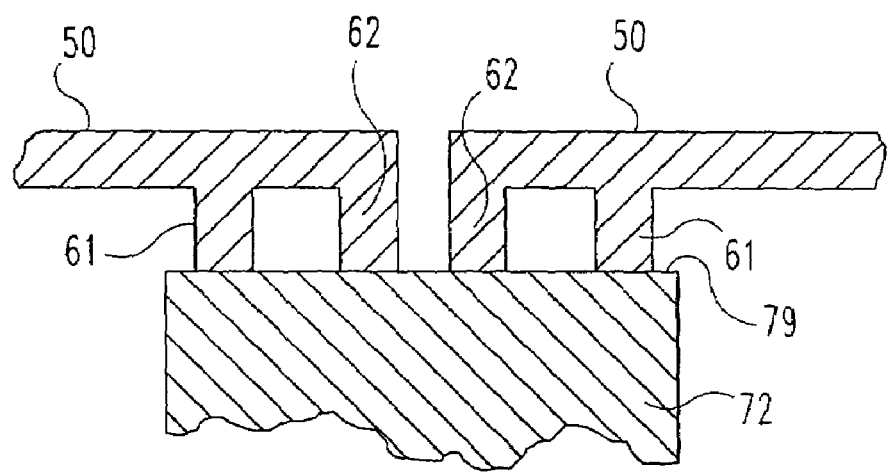
FIG. 11 is another cross-sectional view of the preferred embodiment of the deck board shown in FIGS. 6–7 mounted on a truck load beam.

Each of the first platform channel 75 and the second platform channel 76 defines a plurality of support bars 58 having substantially the same height as that of the side walls 55A–55D. As shown in FIG. 10, when the deck board 50 is positioned on the load beams of the cargo trailer, the first platform channel 75 extends along the center load beam 71 such that the support bars 58 and the side walls (not shown) rest on a top side 77 of the center load beam 71. The angled cross walls 56A and 56B drape along two vertical sides 78 of the center load beam 71. In the same instance, as shown in FIG. 11, the inner side walls 61 and the outer side walls 62 rest on a top surface 79 of the end load beam 72.

Further in this embodiment, the bottom face 53 of the platform 51 defines a plurality of cross bars 60A–60H extending between the side walls 55A–55D. Preferably the cross bars 60A–60H define a honeycomb pattern with individual cells 69 for optimum strength.

Figure 6:
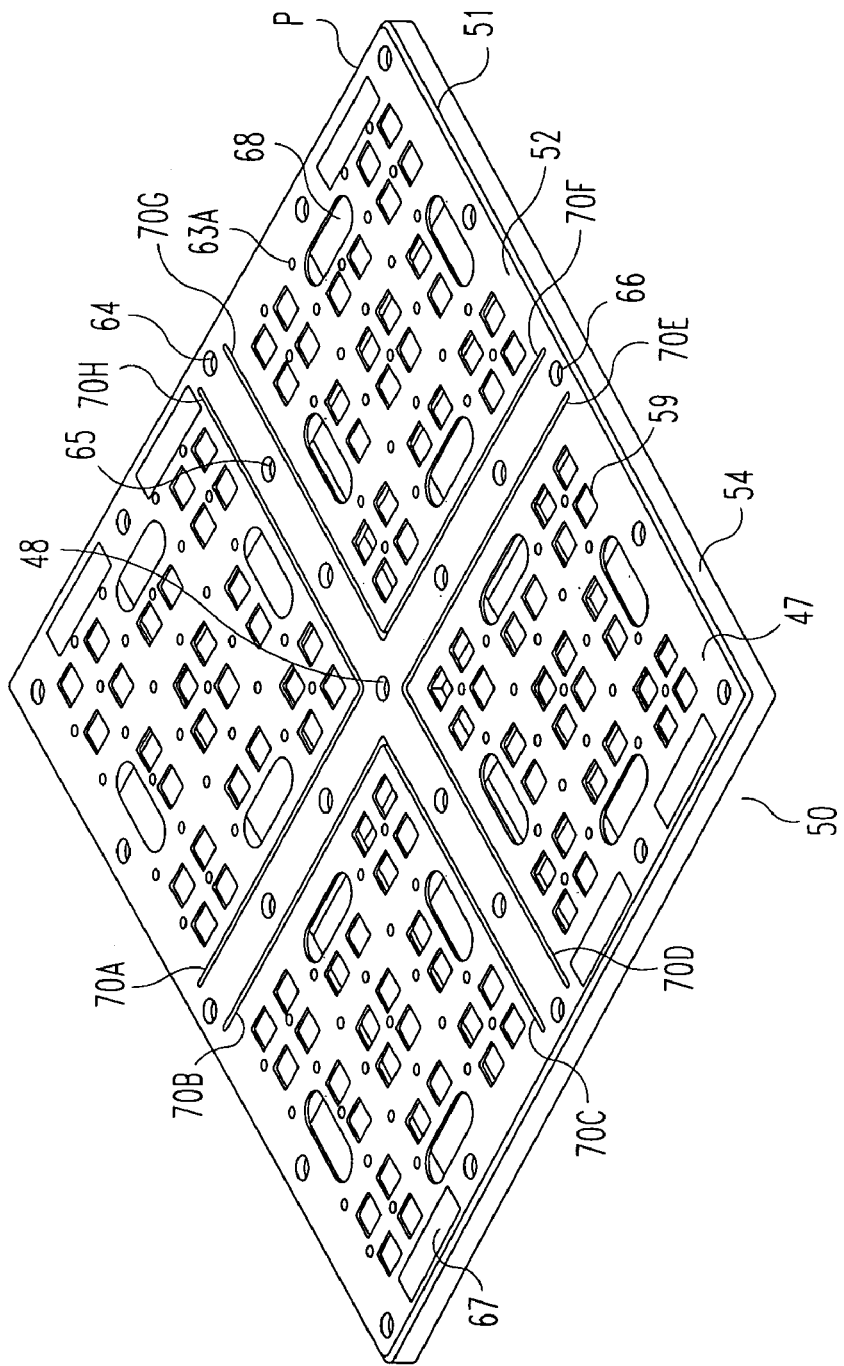
FIG. 6 is a perspective view of a deck board according to another embodiment of the present invention.
Figure 8:
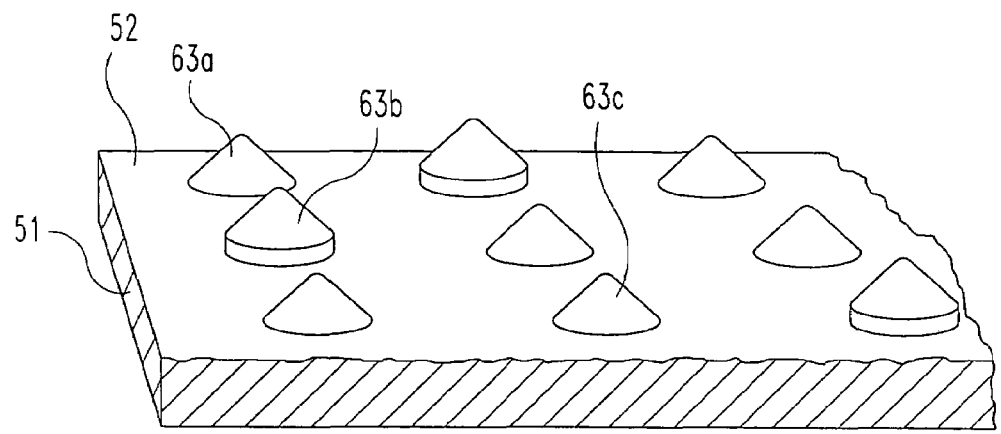
FIG. 8 is an enlarged perspective partial view of the top face of the deck board shown in FIGS. 6–7.

As shown in FIGS. 6 and 8, the top face 52 can define a plurality of nodular protrusions 63A, 63B and 63C operable to increase surface friction to reduce slippage of cargo on the deck board. Preferably, the nodular protrusions 63A, 63B and 63C have a substantially conical shape or a pyramid shape to increase wear resistance. Moreover, the protrusions can have variable heights as demonstrated in FIG. 8. When the cargo is placed on the top face 52, the nodular protrusions 63A, 63B and 63C provide surface friction to reduce slipping and sliding of the cargo during its transport. The variable height protrusions, wear down at different rates, and thus prolong the life of the entire array of protrusions. Most preferably, the nodular protrusions 63A, 63B and 63C can be molded on the plastic platform 51.

Figure 9:
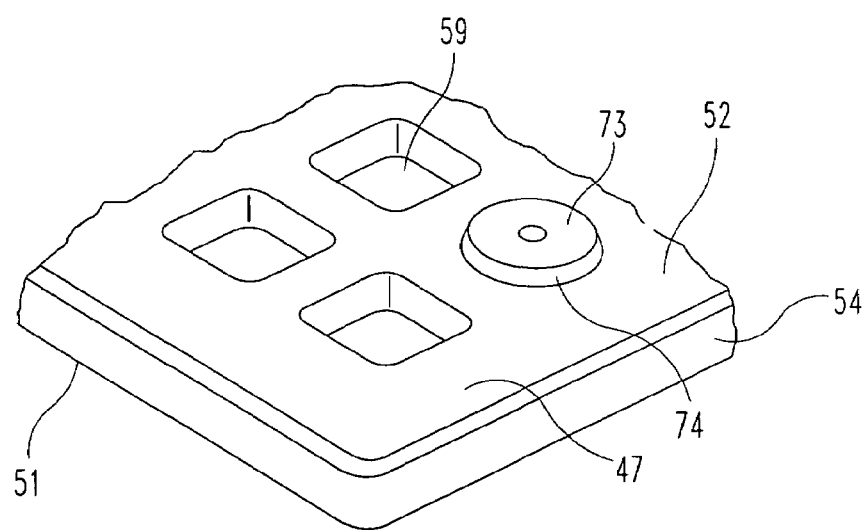
FIG. 9 is an enlarged perspective partial view of the top face of a deck board according to a further embodiment of the invention.

Referring to FIG. 9, the top face 52 can also include a plurality of rubber stoppers 73 mounted along the surface edges 47 of the top face 52. A top portion 74 of each rubber stopper 73 protrudes slightly from the top face 52 to prevent the cargo from sliding off the deck board 50. A lower portion of the stopper can fit within an opening in the board, such as opening 59. The rubber stoppers 73 are configured to provide surface friction that helps slippage between stacked deck boards.

Returning to FIGS. 6, 7 and 9, the platform 51 further defines a plurality of openings 59 extending between the top face and the bottom face therethrough, so that the weight of the platform 51 is reduced. Two or more of the openings 59 preferably have a predetermined shape suitable for functioning as handholds 68. The openings 59 may be positioned for receiving cargo fasteners (not shown). The cargo fasteners can be a rope, a strap, or a belt for securing the cargo to the deck boards 50.

Similar to the platform 11 in the embodiment shown in FIGS. 1–4, the platform 51 further includes a plurality of bores 64 (see FIG. 6) extending at least partially between the top face 52 and the bottom face 53 therethrough. The bores 64 are disposed adjacent to the perimeter P of the platform 51, and preferably along the first platform channel 75 and the second platform channel 76. The bores 64 are capable of receiving support posts (not shown) or receiving fasteners (not shown) to secure the platform 51 to a center load beam or an end load beam. In addition, the bores 64 may receive fasteners (not shown) for retaining a plurality of platforms together. Each of the bores 64 defines an interior cylindrical wall 65, which may include a web 66 extending across the interior cylindrical wall 65 for supporting the support post. In addition, the inner side walls 61 may span across the bores 64 to provide further support.

Furthermore, in the preferred embodiment shown in FIG. 6, the top face 52 defines recessed slots 70A–70H positioned for receiving the first end of the angled cross walls 56A–56H of another deck board. When two or more deck boards are being stored, they can be stacked on top of each other such that the angled cross walls of the top deck board fit into the recessed slots of the bottom deck board. This feature allows several deck boards to be sturdily stacked together with little risk of the deck boards slipping off the stack.

In a further feature of the most preferred embodiment, an identifying means can be incorporated into the deck board by molding in a design 35 (see FIG. 1) specifying use or ownership. Because the molded design cannot be readily removed, the deck board will not be easily misidentified or stolen. Alternatively, at least one depression 67 (see FIG. 6) can be molded into the top face 52 of the platform 51 to receive an identification label (not shown). The depression 67 keeps the identification label protected below the surface of the deck board.

In addition, since the invention contemplates a molded plastic product, the plastic can be injected with a predetermined color during the molding process. Since the color is in the plastic material itself, it cannot fade or chip and does not require re-painting as would be necessary for a wooden pallet. The color of the deck board can be used to readily identify boards belonging to a particular transport company, whether to facilitate the return of the deck boards to the owner or to identify a stolen board.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A deck board for supporting cargo on trailer load beams comprising:
   a platform having a hollow chamber defined by a top face, a bottom face, and side faces,
   said platform defining a plurality of walled openings extending through said hollow chamber between said top face and said bottom face; and
   means defined on said bottom face for retaining said deck board on said load beams, said means for retaining including a plurality of raised ribs defined on said bottom face, said raised ribs having a predetermined shape that defines a plurality of channels for receiving said load beams.

2. The deck board according to claim 1, wherein said platform is composed of plastic.

3. The deck board according to claim 2, wherein said platform is formed as a single molded platform.

4. The deck board according to claim 3, wherein the plastic is molded with a predetermined color to serve as an indicia for the deck board.

5. The deck board according to claim 4, wherein a predetermined indicia is molded into said platform.

6. The deck board according to claim 1, wherein a number of said walled openings have a predetermined shape forming handholds.

7. The deck board according to claim 6, wherein a pair of handholds are defined adjacent each of said side faces.

8. The deck board according to claim 1, wherein said top face includes a plurality of nodular protrusions operable to increase surface friction.

9. The deck board according to claim 1, wherein said platform includes intersections of said side faces defining truncated corners juxtaposed between two obtuse angles.

10. The deck board according to claim 1, wherein at least one of said plurality of walled openings is a cylindrical bore substantially centrally disposed between said side faces.

11. The deck board according to claim 10, wherein at least four cylindrical bores are substantially centrally disposed between said side faces.

12. The deck board according to claim 11, wherein each of said cylindrical bores defines an interior cylindrical wall and a removable web extending across said interior cylindrical wall between said top face and said bottom face of said platform.

13. A deck board for supporting cargo on trailer load beams comprising:

a platform having a hollow chamber defined by a top face, a bottom face, and side faces, said platform defining a plurality of walled openings extending through said hollow chamber between said top face and said bottom face, at least one of said plurality of walled openings defines an interior cylindrical wall and a removable web extending across said interior cylindrical wall between said top face and said bottom face of said platform; and means defined on said bottom face for retaining said deck board on said load beams.

14. The deck board according to claim 13, wherein said plurality of walled openings includes at least four cylindrical bores substantially centrally disposed between said side faces.

15. The deck board according to claim 13, wherein a number of said walled openings have a predetermined shape forming handholds.

16. The deck board according to claim 15, wherein a pair of handholds are defined adjacent each of said side faces.

17. The deck board according to claim 13, wherein said platform is composed of plastic.

18. The deck board according to claim 17, wherein said platform is formed as a single molded platform.

* * * * *